United States Patent [19]
Craft et al.

[11] Patent Number: 5,191,810
[45] Date of Patent: Mar. 9, 1993

[54] VEHICLE MODULAR CLUTCH ATTACHING ARRANGEMENT

[76] Inventors: Barrie G. Craft, 7566 West Rd., Washington, Mich. 48094; Peter Doll, 6421 Elsey Dr., Troy, Mich. 48098; Frank Martin, Matthias Gruenewald Ring 67, 8720 Schweinfurt, Fed. Rep. of Germany

[21] Appl. No.: 929,479

[22] Filed: Aug. 17, 1992

Related U.S. Application Data

[63] Continuation-in-part of Ser. No. 812,488, Dec. 23, 1991, abandoned.

[51] Int. Cl.⁵ .................. G05G 01/00; G05G 03/00; F16D 13/00; F16B 09/00
[52] U.S. Cl. .................. 74/572; 192/70.13; 192/70.16; 192/110 R; 403/260; 403/337
[58] Field of Search ............... 74/572, 573 R; 192/110 R; 403/260, 261, 262, 335, 337

[56] References Cited

U.S. PATENT DOCUMENTS

| | | | |
|---|---|---|---|
| 2,287,532 | 6/1942 | Patterson | 74/573 R X |
| 2,835,141 | 5/1958 | DeLorean | 74/572 |
| 2,850,131 | 9/1958 | Maurice et al. | 192/70.13 X |
| 2,943,503 | 7/1960 | Förster | 74/572 X |
| 2,982,150 | 5/1961 | Kolbe | 74/572 X |
| 3,023,636 | 3/1962 | Kelley et al. | 74/572 X |
| 3,128,639 | 4/1964 | Hein et al. | 74/572 |
| 3,299,735 | 1/1967 | Stott | 74/572 |
| 3,862,677 | 1/1975 | Bahr | 192/48.4 |
| 4,220,233 | 9/1980 | Ban et al. | 192/106.2 |
| 4,254,668 | 3/1981 | Kessinger et al. | 74/572 |
| 4,353,444 | 10/1982 | Bionaz | 192/3.29 |
| 4,445,601 | 5/1984 | Hofbauer et al. | 74/572 X |
| 4,650,050 | 3/1987 | Alas et al. | 192/70.12 |
| 4,751,993 | 6/1988 | Fukushima | 192/106.7 |
| 4,895,232 | 1/1990 | Kobayashi | 192/110 R X |
| 4,932,286 | 6/1990 | Fukushima | 74/574 |

FOREIGN PATENT DOCUMENTS

| | | | |
|---|---|---|---|
| 629975 | 10/1961 | Canada | 74/572 |
| 61-233241 | 10/1986 | Japan | 74/572 |
| 61-233242 | 10/1986 | Japan | 74/572 |
| 1001538 | 8/1965 | United Kingdom | 74/572 |

Primary Examiner—Leslie A. Braun
Assistant Examiner—David E. Henn
Attorney, Agent, or Firm—Edward P. Barthel

[57] ABSTRACT

A manual transmission modular clutch unit is provided comprising a clutch cover assembly, a clutch friction disc assembly, and a flywheel disc assembly which modular clutch unit may be pre-assembled and balanced off line prior to shipment to a vehicle assembly plant. The manual transmission modular clutch unit contains each clutch component with the exception of an engine starter ring which is customarily attached to the clutch flywheel disc. A unique attaching arrangement is provided for the pre-installation of an automatic transmission drive plate on each engine crankshaft of a vehicle assembly line. As the drive plate is interchangeable with either a manual transmission modular clutch unit or an automatic transmission torque converter both manual and automatic transmission vehicles may be built on a common assembly line while minimizing both labor and parts.

7 Claims, 3 Drawing Sheets

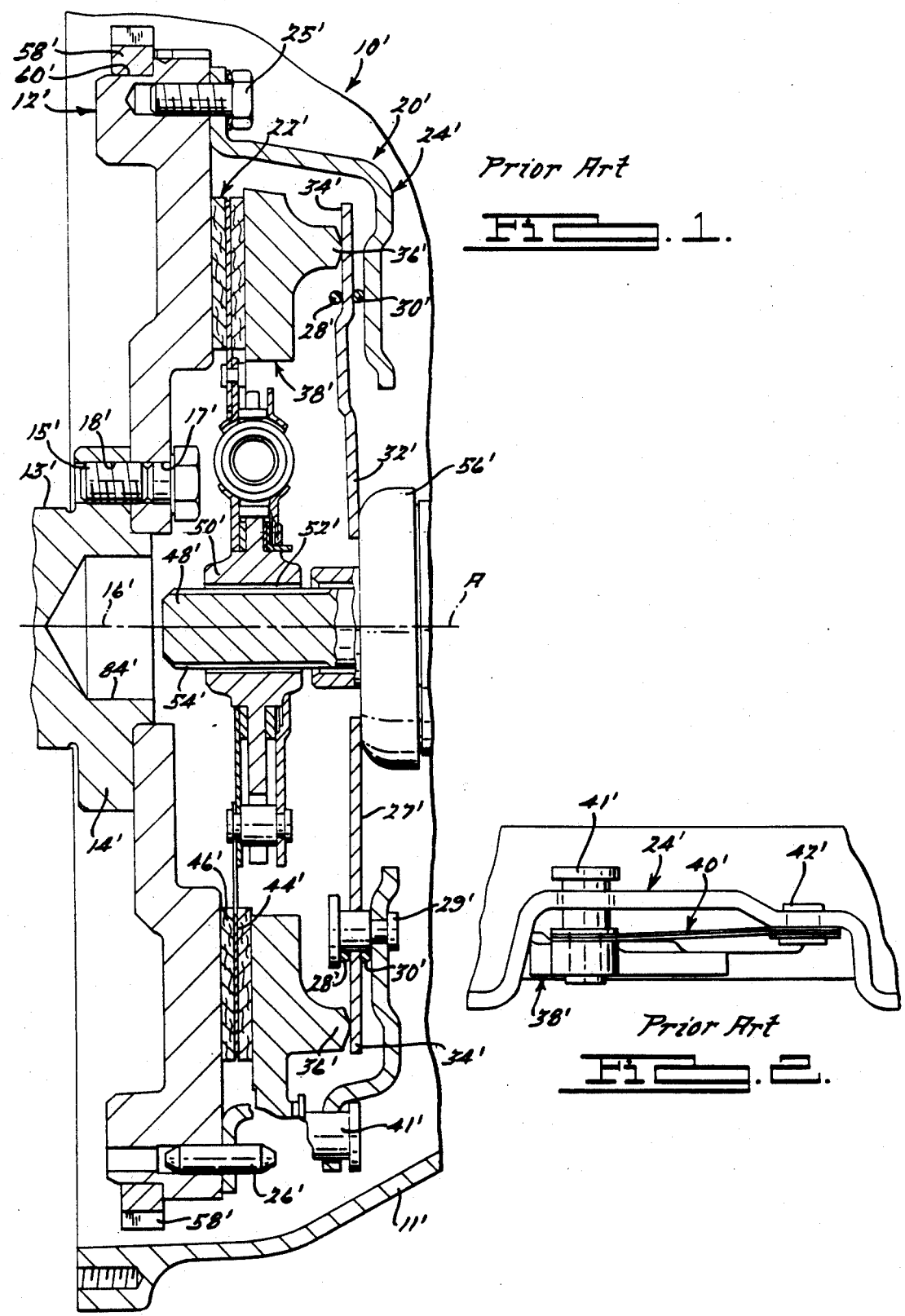

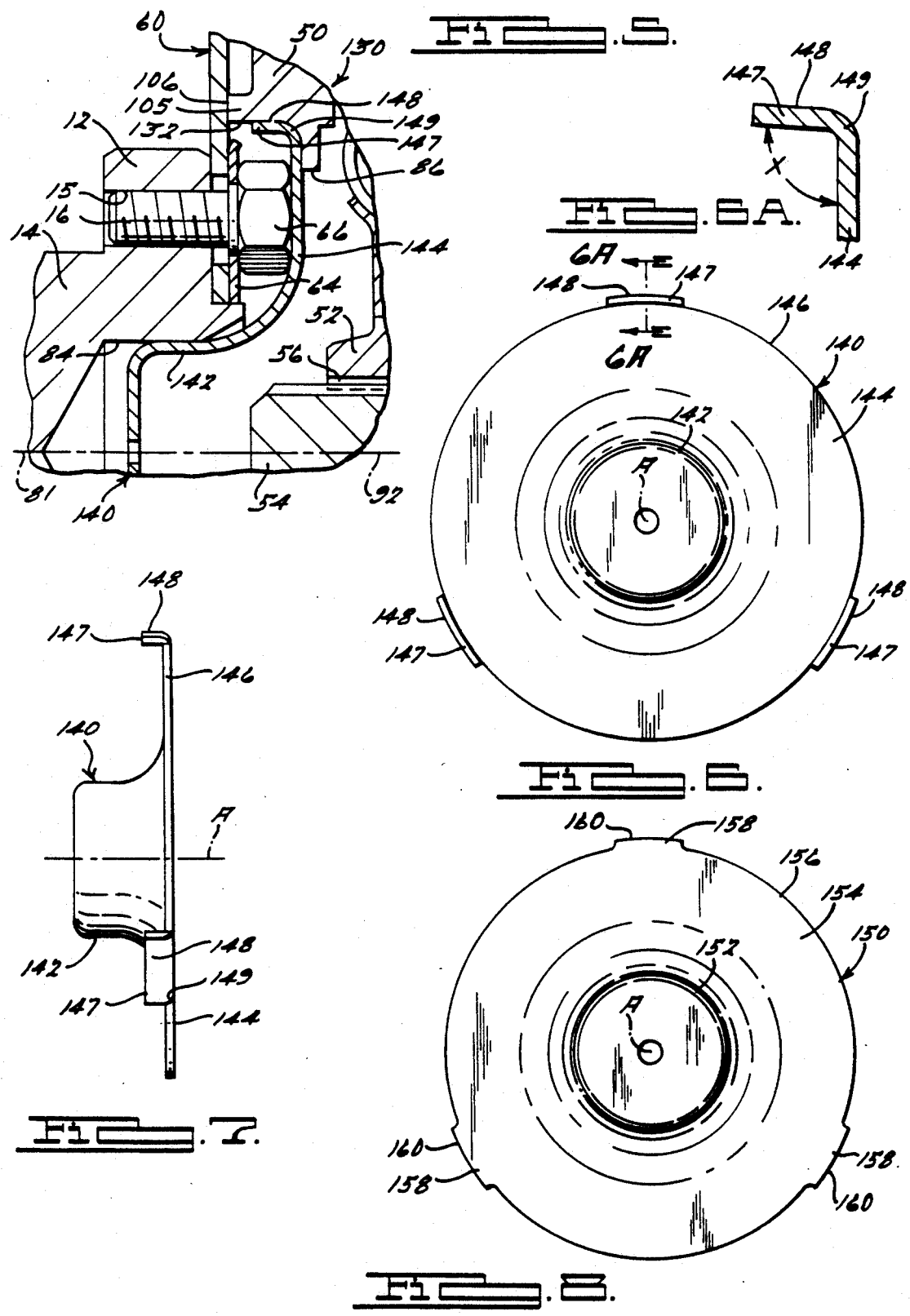

VEHICLE MODULAR CLUTCH ATTACHING ARRANGEMENT

The present application is a continuation-in-part of the co-pending patent application Ser. No. 07/812,488, filed Dec. 23, 1991, now abandoned.

BACKGROUND OF THE INVENTION

This invention relates to manual transmission clutches for automotive vehicles and more particularly to a modular friction clutch unit which is pre-assembled and balanced off line for installation on manual transmission equipped cars produced on a common production line in an interchangeable manner with the remaining cars being equipped with automatic transmissions.

In current vehicle assembly plant operations a first attaching arrangement is required to install an automatic transmission torque converter on the engine crankshaft of an automatic drive vehicle and a second attaching arrangement is required to install a manual transmission friction clutch on an engine crankshaft of a manual drive vehicle. The U.S. Pat. No. 4,586,401 issued May 6, 1986 to T. D. Nogle discloses a vehicle automatic transmission torque converter having its drive plate connected to the engine crankshaft so as to be piloted therefrom in a conventional manner.

An example of a conventional mounting arrangement currently used in vehicle assembly plants for installing a manual transmission friction clutch on an engine crankshaft is disclosed in prior art FIG. 1. FIG. 1 shows a current production friction clutch assembly 10', located within a manual transmission housing 11', having a flywheel 12' connected to and rotatably driven by a prime mover such as an automotive engine (not shown). The flywheel 12' is mounted on the output end of an engine crankshaft 13' by means of a radial collar 14' formed thereon. A plurality of machine bolts 15' are arranged in a circle about transmission and clutch axis A' coaxial with the crankshaft axis of revolution 16' with the bolts 15' extending through associated circumferentially distributed flywheel holes 17' for engagement in aligned threaded collar bores 18'.

The clutch assembly 10' comprises a clutch cover and pressure plate assembly 20', a disc assembly 22', and the flywheel 12'. The clutch cover and pressure plate assembly 20' includes a clutch cover 24', suitably secured to the flywheel 12' such as by circumferentially distributed bolts 25', and carries pivot ring retaining studs 26' which are arranged in a circle about the clutch axis A'. The clutch cover and pressure plate assembly 20' further includes a diaphragm spring 27' provided with a first pivot ring 28', held by the heads of rivets 29' and a second identical pivot ring 30' held between the diaphragm spring 27' and the clutch cover 24'.

The diaphragm spring 27' includes a central portion, fragmented into radially inwardly projecting spring fingers, partially indicated at 32', a radially outermost main spring section 34' which normally bears against adjacent projections 36' of pressure plate 38' and the spring fingers 32'.

As seen in prior art FIG. 2 the cover assembly 20' is axially movably secured to cover base 24' by a set of substantially tangentially extending leaf springs strips 40' with each set secured at one end to the pressure plate 38' by rivet 41' and secured at the opposite end to the clutch cover 24' by rivet 42'. The leaf spring strips 40' allow for a limited axial movement of the pressure plate 38' while permitting the transfer of torque between the clutch cover 24' and the pressure plate 38'. The pressure plate 38' is normally biased against the adjacent one friction lining 44' of the disc assembly 22' by the diaphragm spring radially outermost main section 34' which normally bears against the adjacent projections 36' of the pressure plate 38'. The other friction lining 46' of the friction clutch disc assembly 22' then bears against the flywheel 12' and transmits torque to the transmission input shaft 48' through the medium of a hub 50' having internal splines 52' extending into complementary external splines 54' on the output shaft 48'. The fingers 32' can be engaged and shifted in the axial direction toward the flywheel 12' by a suitable thrust bearing 56'. At such time, the diaphragm main section spring 34' is tilted between the two pivot rings 28' and 30' in a conventional manner. It will be noted in FIG. 1 that starter ring gear 58' is suitably fixed to the flywheel 12' in a concentric manner relative to clutch axis "A" and crankshaft blind bore 84' by being seated in outer annular flywheel notched-out shoulder 60'.

SUMMARY OF THE INVENTION

It is a feature of the present invention to provide a manual transmission modular clutch unit attaching arrangement adapted for ready assembly line mounting to an automatic transmission drive plate pre-installed on each assembly line vehicle crankshaft.

It is another feature of the present invention to provide a manual transmission modular clutch unit attaching arrangement as set forth above wherein fewer parts and reduced labor are required during assembly line installation of manual transmission modular clutch units.

It is still another feature of the present invention to provide a manual transmission clutch unit attaching arrangement as set for above wherein precise balancing of the modular clutch unit may be performed off line, prior to its assembly line mounting on a vehicle crankshaft drive plate, thereby minimizing vehicle driveline vibration.

To accomplish these and other objectives and features, a conventional manual transmission clutch flywheel is replaced by a flywheel plate assembly comprising a driven flywheel plate and a pilot mounting plate. The invention involves fabrication of a modular clutch assembly consisting of a clutch cover assembly, a clutch disc assembly an the flywheel assembly at an off-line or remote location such as a supplier's plant. The clutch cover assembly may be suitably attached, as by riveting or welding, to the flywheel plate assembly minimizing tooling cost while allowing the clutch disc assembly to be aligned on the modular clutch assembly. The modular clutch assembly is then adapted to be installed on the production line of a vehicle assembly plant by means of a novel crankshaft piloting arrangement. As a result, a manual transmission modular clutch is installed in a manner compatible with the conventional assembly line procedure wherein automatic transmission torque converter drive plates are pre-installed on each vehicle crankshaft programmed for automatic drive. To optimize the efficiency of the assembly system together with the modular clutch system, the flywheel plate side of the modular clutch is designed with a raised annular backing land to minimize the deflection of its associated drive plate.

BRIEF DESCRIPTION OF THE DRAWINGS

These and other objects, features and advantages of the present invention will appear from the following written description and the accompanying drawings in which:

FIG. 1 is a fragmentary vertical cross section, partly in elevation, of a prior art manual transmission modular clutch;

FIG. 2 is a fragmentary radially inward elevational view taken in the direction of arrow "FIG. 2" in FIG. 1;

FIG. 5 is a fragmentary, enlarged vertical cross-section, partly in elevation, of a modified pilot member and flywheel disc arrangement for the manual friction clutch of the present invention;

FIG. 6 is an enlarged detail plan view of the pilot member of FIG. 5;

FIG. 6A is a fragmentary enlarge vertical cross-sectional view taken on the line 6A—6A of FIG. 6;

FIG. 7 is a side view of the pilot member of FIG. 6; and

FIG. 8 is an enlarged detail plan view of the pilot member of FIG. 3.

DETAILED DESCRIPTION OF THE PREFERRED EMBODIMENT

Figure 3:
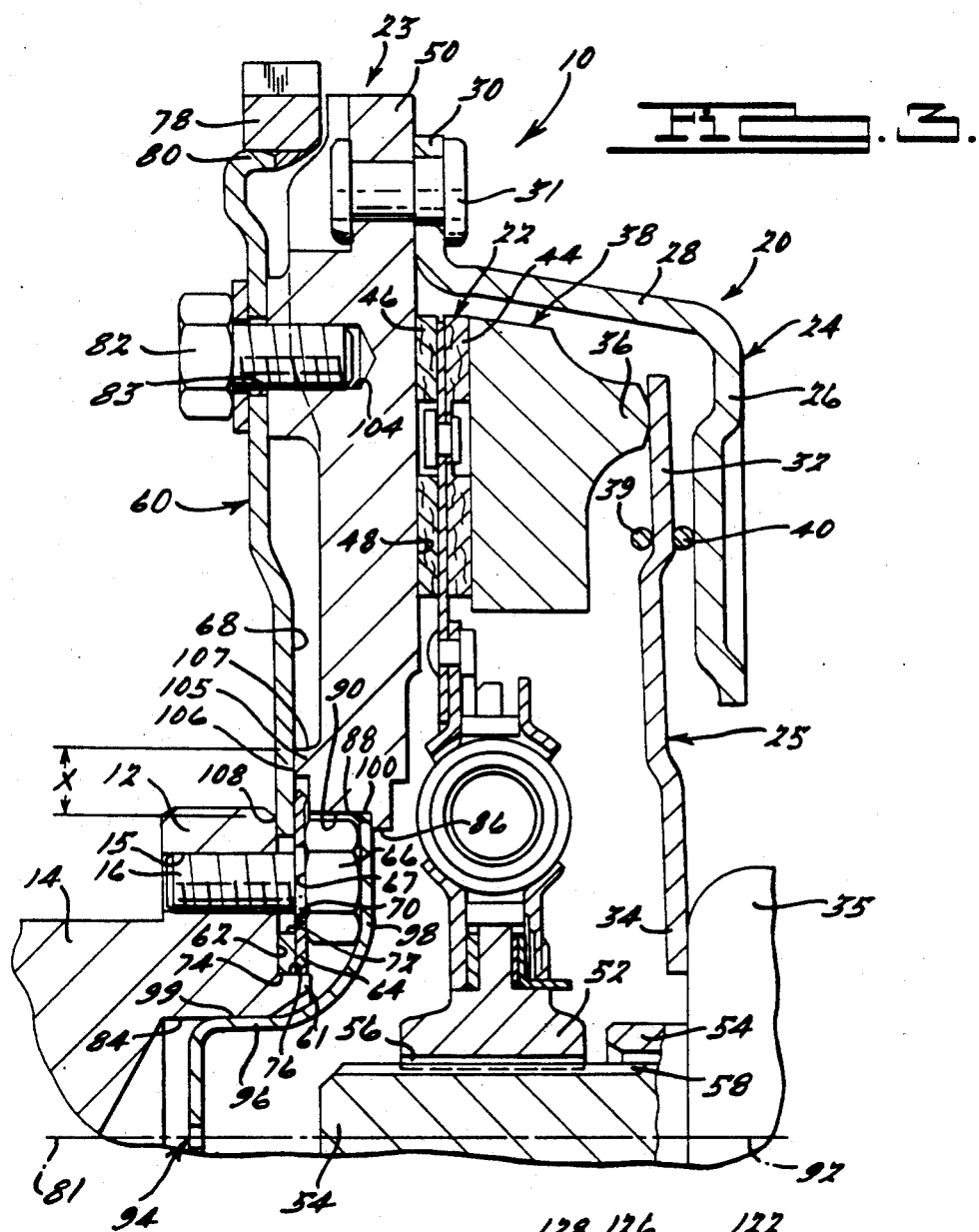
FIG. 3 is a fragmentary vertical sectional view, partly in elevation, of the manual friction clutch of the present invention.

Turning now to the drawings and more particularly to FIG. 3, an illustrative embodiment of a pre-assembled modular clutch arrangement, indicated generally at 10, is secured to radial collar 12 formed at one output end of an engine crankshaft 14. The collar 12 has a plurality of circumferentially distributed threaded holes 15 each receiving a machine bolt fastener 16 therein in a conventional manner common with existing automatic transmission assembly procedure. The modular clutch arrangement 10 comprises a clutch cover assembly 20, a friction disc assembly 22, and a flywheel disc assembly 23. The clutch cover assembly 20 includes a conventional pan-shaped clutch cover 24 and diaphragm spring unit 25. The clutch cover 24 is defined by a transverse base portion 26, an annular frusto-conical shaped wall portion 28, and a radial peripheral flange portion 30 shown secured by a plurality of circumferentially spaced rivets 31 to the clutch flywheel disc assembly 23.

The diaphragm spring unit 25 includes a radially outer spring section 32 and a central portion fragmented into radially inner spring fingers partially indicated at 34. The diaphragm outer spring section 32 normally bears against adjacent projections 36 of pressure plate 38. The radially inwardly projecting fingers 34 are engaged and shifted in the axial direction of the flywheel assembly 23 by a thrust bearing 35 or by other suitable clutch actuating means. At such time, the diaphragm spring unit 25 is tilted between a first pivot ring 39, which normally bears against pressure plate projection 36 and the inwardly projecting fingers 34, and a second pivot ring 40 held between the diaphragm spring fingers 34 and the cover base portion 26. The pivot rings 39 and 40 are suitably held on the cover base portion 26 such as by a set of rivets as shown by the rivet 291 of prior art FIG. 1.

The cover assembly 20 is secured to and rotates with the flywheel disc assembly 23 which assembly constitutes the axially fixed pressure plate of the modular clutch. The pressure plate 38 is axially movably secured to the cover assembly 20 by a set of substantially tangentially extending leaf springs, such as shown at 40' in prior art FIG. 2. The pressure plate 38 is normally biased against the adjacent lining 44 of the clutch disc assembly 22 by the diaphragm spring unit 25. The other friction lining 46 of the clutch disc assembly 22 then bears against transverse surface 48 of flywheel disc 50 while hub 52 of the disc assembly 22 transmits torque to transmission shaft 54 through the medium of an annulus of axially parallel hub internal splines 56 extending into complementary exterior splines 58 of the adjacent portion of the transmission shaft 54.

With reference to FIG. 3 a conventional automatic transmission drive plate, generally indicated at 60, is shown supported on annular axial neck portion 61 projecting from transverse end face 62 of the crankshaft radial collar 12 by means of the fasteners 16. Hex heads 66 of the fasteners 16 are torqued against a backing ring member 64 interposed between each fastener bolt head undersurface 67 and the opposed clutch facing one inner side surface 68 of the drive plate 60. It will be noted that each fastener 1 6 extends through aligned associated holes 70 and 72 in backing ring member 64 and drive plate 60, respectively. The drive plate 60 is shown formed with a central mounting hole 74 snugly received on external cylindrical shoulder 76 formed by the crankshaft axial neck portion 61. Such structure allows starter ring gear 78, fixed as by welding to the outer peripheral flange 80 of the drive plate 60, to be concentrically aligned on the crankshaft rotational axis 81.

It will be appreciated that in the above described manner a drive plate 60 is normally pre-assembled on each vehicle crankshaft 14 scheduled for the assembly line installation of an automatic transmission. The drive plate 60 is adapted to be secured to an automatic transmission by a second set of fasteners or machine bolts 82 extending through outer drive plate holes 83 threadably engaged into aligned axial bores of a torque converter casing as shown, for example, in the above mentioned Nogle U.S. Pat. No. 4,586,401.

The present invention involves installation of a automatic transmission drive plate 60 on the crankshaft 14 of each assembly line vehicle, such that the drive plate 60 is a common interchangeable part for either an automatic or a manual transmission vehicle, by means of a unique manual transmission modular clutch unit adaptive mounting arrangement. It will be seen in FIG. 3 that each crankshaft free end is provided with an axial blind bore 84 adapted to journally receive therein one end an automatic transmission casing central stub shaft portion in a conventional manner. Reference may be made to the above mentioned Nogle patent, for example, which shows this construction. Further, FIG. 3 shows the modular clutch flywheel disc 50 formed with a central circular opening 86 bordered by an annular countersunk recessed radially extending locating wall portion 88 provided in the flywheel disc one side with such one side facing the drive plate 60. The recessed locating wall portion 88 defines an axially extending cylindrical internal shoulder portion 90 concentrically disposed about the modular clutch unit principal axis 92 operative for centering the clutch unit on the shaft axis 81.

A hat-shaped clutch flywheel mounting pilot member, shown generally at 94 in FIG. 3, is symmetrically disposed about the crankshaft axis 81 by virtue of its axially extending cylindrical hub or cup portion 96 being snugly received for tight close tolerance insertion in the crankshaft blind bore 84. Radially extending annular radial flange portion 98 of the pilot member 94 has its outer circular free edge 100 sized so as to establish a predetermined external diameter. Thus, the radial flange portion free edge 100 is adapted to be received in a press-fit installed manner on the internal shoulder 90 of the clutch flywheel disc 50 resulting in both the pilot member cylindrical cup portion outer surface 99 and the starter ring gear 78 concentrically disposed about the clutch axis 92. By virtue of the present invention the modular clutch unit 10 may be shipped to the vehicle assembly plant with the pilot member 94 attached by means of its radial flange portion outer circular edge 100 retained in a press-fit manner to the flywheel internal shoulder 90.

It will be appreciated that upon assembly the modular clutch unit 10 and the attached pilot hub member 94 may be precisely rotatably balanced about the clutch unit principal axis 92. For example, the rotational balancing may be performed either prior to shipment of the modular clutch unit 10 to the vehicle assembly plant or at any other time prior to mounting the modular clutch unit on the vehicle crankshaft.

With the pilot hub member 94 mounted on the crankshaft 14 the clutch unit principal axis 92 coincides with the crankshaft axis of rotation 81. Upon the outer bolt fasteners 82 being secured in their associated flywheel plate threaded bores 104 the ring gear 78 will be concentrically disposed about the modular clutch unit principal axis 92 for balanced rotation therewith.

FIG. 3 shows the pilot member radial flange 98 oriented for flatwise contact with each of the inner bolt heads 66. By virtue of this arrangement engine axial reaction loads applied to the flywheel disc 50 are transferred via radial flange 98, bolt head 66, ring 64, and drive plate 60 to the crankshaft collar 12.

It will be seen in FIG. 3 that the one side of the flywheel disc 50, facing the drive plate 60, is formed with an axially raised extending annular concentric land portion 105. The land portion 105 has a concentric annular surface 106 extending radially predetermined dimension and is adapted for flatwise engine axial reaction load contact with the drive plate inner surface 68 and thence to the crankshaft collar 12. The land portion 105 has its radially outer circular edge 107 located radially outwardly a predetermined distance "X" from the engine axial reaction load high stress annular drive plate juncture with the collar beveled circular edge indicated at 108. Road tests conducted with four cylinder engine vehicles have determined that to achieve a minimum bending stress in the drive plate resulting from engine axially directed reaction loads the bending moment radial distance "X" should as small as practicable. In the preferred embodiment the raised land portion 105 has a radial extent of the order of three millimeters (3 mm) and a radial dimension "X" from land portion outer edge 107 of the order of eight millimeters (8 mm). Thus, upon the outer bolt fasteners 82 being threadably tightened either the pilot member radial flange 98 or the raised land surface 106 provides a reaction path for transferring flywheel disc axial loads to the crankshaft collar 12. It will be noted, however, that the reaction load path depends on the tolerance stackup of the modular clutch parts.

Thus, in some cases the radial flange 98 may be in flatwise contact with the bolt head 66 in addition to the raised land surface 106 being in flatwise contact with the drive plate opposed surface thereby creating dual reaction load paths.

Figure 4:
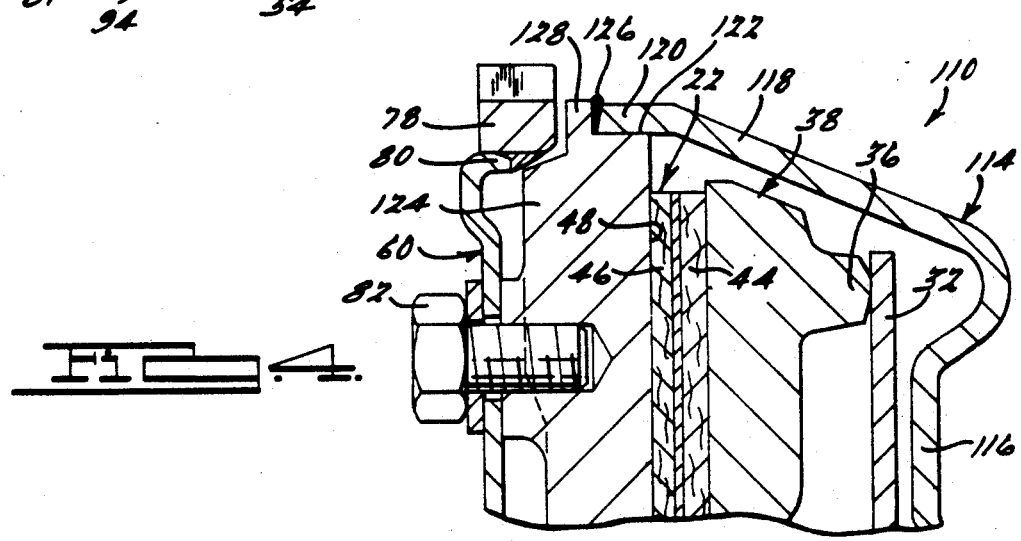
FIG. 4 is a view similar to FIG. 1 showing an alternate method of securing the clutch cover assembly to the clutch disc assembly.

With reference to FIG. 4 there is shown a modified modular clutch unit cover assembly wherein like reference numerals indicate like or corresponding elements depicted in the FIG. 3 embodiment of the invention. The cover assembly 110 has a pan-shaped clutch cover 114 formed with a transverse base portion 116 having a frusto-conical shaped annular outer wall portion 118 terminating in an axially extending peripheral flange portion 120. A stepped annular axially extending indent 122 is formed around the periphery of clutch flywheel disc 124 sized for the lapped reception of the axial flange portion 120 enabling welded seam joint 126 to readily secure the clutch cover 114 to the flywheel indent radial wall 128 eliminating the need for rivet or bolt fasteners.

In FIGS. 5-7 a modified pilot member design is shown providing increased torsional resistance relative to the flywheel disc assembly 130 while also enabling the pilot member 140 to be readily assembled therewith. In the following discussion, the same reference numbers will be used to denote the same or similar components described in FIGS. 3 and 4.

FIG. 5 discloses a portion of a flywheel disc assembly 130 substantially identical to the flywheel disc assembly of FIGS. 3 and 4 with the exception that its flywheel disc 50 provides an axially extending cylindrical internal shoulder portion 132 having a diameter of a predetermined dimension greater than the internal shoulder portion 90 of the FIGS. 3 and 4 embodiment. It will be noted that in the FIG. 5 modification there is no direct contact between the flywheel disc 50 and the backing ring member 64 thereby eliminating the reaction load path therebetween. However, the reaction load paths via the land portion annular surface 106 and the radial flange 98 remain.

With reference to FIGS. 5-7 a first modified pilot member 140 is shown formed sheet material, such as sheet steel, comprising an axially extending cylindrical hub or cup portion 142 adapted for insertion in the crankshaft blind bore 84 in a close tolerance friction or interference press fit manner. Thus, the pilot member principal axis "A" coincides with the central axis 81 of the crankcase 14.

A radially extending annular flange portion 144 of the pilot member 140 has its outer circular edge 146 formed with a plurality of identical, equally spaced, bent tabs 147. As seen in FIG. 5, the tabs 147 of the installed pilot member extend axially in the direction of the cup portion 142 with each tab having an arcuate shape in transverse section (FIG. 6). It will be noted in FIG. 6A that the each tab 147 is bent at a slight obtuse angle "X" relative to the radial flange portion 144. In the preferred embodiment the obtuse angle "X" is of the order of ninety-three (93) degrees such that each tab 147, in its free unstressed state, is beveled outwardly. Thus, as seen in FIG. 6 each tab 147 in its free state defines an arcuate sector concentrically disposed about pilot member axis "A".

FIG. 6 illustrates the flange portion circular edge 149 formed with three tabs 147 wherein their arcuate surface portions 148 define an imaginary frusto-conical surface symmetrically disposed about the pilot member axis "A" shown in FIG. 7. It will be appreciated that each tab 147 provides a smooth radiused lead-in bend portion 149 allowing ready insertion in the disc internal cylindrical shoulder portion 132. Upon the pilot member tabs 47 being inserted in the cylindrical internal shoulder portion 132 the tabs 147 are flexed inwardly to a right-angle position as seen in FIG. 5. That is to say each tab surface portion 148 is resiliently biased into a conforming interference press-fit with the shoulder portion 132 thus substantially increasing torsional resistance against rotation of the pilot member relative to the disc shoulder portion 132. Further, in their inwardly flexed stressed state of FIG. 5 the tab outer surface portions 148 are concentrically disposed about the pilot member axis "A" thereby insuring concentrically of the pilot member 140 relative to the clutch axis 92.

FIG. 8 depicts a second modified pilot member 150 formed from sheet steel or the like comprising a hub or cup portion 152 and an annular flange portion 154 substantially identical to the pilot member 94 of FIG. 3. The pilot member flange 154 has its outer circular edge 156 formed with a plurality of equally spaced radially projecting lugs 158. The identical lugs 158 provide arcuate lug edges 160 which define a predetermined imaginary cylindrical surface concentrically disposed about pilot member symmetrical axis A. The three arcuate lug edges 160 of pilot member 150 allow ready interference press-fit insertion and concentric positioning in the internal shoulder 90 of FIG. 3, for example, compared to the continuous circular edge 100 of the pilot member 92.

While the principles of the invention in connection with the specific apparatus has been described, it is to be understood that the foregoing detailed description has been made by way of example only and not as a limitation to the scope of the invention as set forth in the accompanying claims.

What is claimed is:

1. A vehicle manual transmission modular clutch attaching arrangement including a flywheel disc assembly adapted to be rotated about a central axis by an engine crankshaft at one output end thereof, said crankshaft rotatable about said central axis with one end thereof formed with a radial collar having a cylindrical outer periphery and a plurality of circumferentially distributed apertures each adapted to receive an associated inner fastener extending through an aligned inner hole of an automatic transmission drive plate for pre-attachment thereto, said drive plate provided with a plurality of circumferentially distributed outer holes, each said inner fastener including a head portion and a shaft portion with the shaft portion extending through an associated drive plate inner holes and engaging an associated aperture in said collar so as to clamp said drive plate on said collar one end, said crankshaft one end formed with an axially extending central bore concentric with said crankshaft axis, said crankshaft one end formed with an axially extending concentrically disposed annular neck portion, said drive plate having a central circular aperture sized for snug reception on said annular neck portion thereby positioning a starter ring gear, fixed on the outer periphery of said drive plate, in concentric relation with said crankshaft central axis, an arrangement enabling the pre-attachment of said drive plate on said crankshaft for subsequent combination with either a manual transmission modular clutch assembly or an automatic transmission comprising:

a flywheel disc for said modular clutch, said flywheel disc having one side adapted to face toward said crankshaft one end with an opposite side thereof facing away from said crankshaft one end, a central circular opening in said flywheel disc having a predetermined diameter substantially equal to the diameter of said collar outer periphery, said central opening bordered by a countersunk annular recess formed in said flywheel disc one side, said flywheel disc recess having an axially extending cylindrical internal shoulder concentric with said modular clutch central axis and a radially disposed locating wall portion;

a pilot member, having a central axially extending cup portion and an outwardly extending radial flange portion, said axial cup portion having an outer cylindrical surface adapted for frictional press-fit engagement with said crankshaft central bore and said radial flange portion having outer circular edge means adapted for press-fit frictional engagement with said flywheel disc recess internal shoulder such that a principal axis of said pilot member axis cup portion coincides with said crankshaft central axis;

said pilot member central axial cup portion engaging said crankshaft central bore and said pilot member radial flange portion engaging said flywheel disc recess internal shoulder such that each said drive plate outer hole is aligned with an associated mounting bore in said flywheel disc one side, wherein upon a plurality of outer fasteners extending through their associated drive plate circumferentially distributed outer holes and engaging associated aligned flywheel disc mounting bores said modular clutch flywheel disc is positively rigidly attached to said drive plate enabling said flywheel disc to be directly rotatively driven by said crankshaft.

2. The modular clutch attaching arrangement as set forth in claim 1, wherein each said inner fastener of said attaching arrangement is a headed bolt, said radial flange portion engaging in flatwise contact with a head of each said inner bolt such that each said inner bolt head transfers axial reaction imparted to said pilot member radial flange portion via said flywheel disc to said crankshaft collar.

3. The modular clutch attaching arrangement as set forth in claim 1, wherein said flywheel disc is formed with a raised land portion extending axially a predetermined minimal dimension from the annular juncture of said collar end face with said drive plate inner surface, said land portion having an annular surface located in a transverse plane spaced axially a predetermined dimension from said crankshaft one end, whereby an opposed inner surface portion of said drive plate is in flatwise contact with said land portion annular surface operative for transferring axial reaction loads, imparted to said drive plate from said flywheel disc, to said crankshaft collar so as to minimize drive plate bending stress.

4. The modular clutch attaching arrangement as set forth in claim 1, wherein said outer circular edge means comprises a radial flange circular edge formed with a plurality of equally spaced tabs extending in the direction of said cup portion, each said tab being arcuate-shaped in transverse section and bent at a predetermined obtuse angle relative to said radial flange portion such that in their free state said tabs are beveled outwardly whereby their outer surface portions define an imaginary exterior frusto-conical surface, whereby upon said tabs being inserted in said flywheel disc internal shoulder portion said each said tab is flexed inwardly such that its outer surface portion is resiliently biased into an interference press-fit within said cylindrical internal shoulder portion thereby providing increased torsional resistance to rotation relative to said internal shoulder.

5. The modular clutch attaching arrangement as set forth in claim 4 wherein each said beveled tab in its free state defines an obtuse angle with said radial flange of the order of ninety-three degrees.

6. The modular clutch attaching arrangement as set forth in claim 4 wherein each said provides a smooth radiused lean-in bend portion enabling said pilot member to be readily inserted in said cylindrical shoulder portion.

7. The modular clutch attaching arrangement as set forth in claim 1, wherein said outer circular edge means comprises a radial flange circular edge formed with a plurality of equally spaced, identical, radially projecting lugs, each said lug having an arcuate outer lug edge sector, whereby said lug arcuate edge sectors define an imaginary exterior circle of predetermined diameter such that said lug arcuate edge sectors provide a conforming interference press-fit upon insertion of said disc cylindrical internal shoulder.

* * * * *

UNITED STATES PATENT AND TRADEMARK OFFICE
CERTIFICATE OF CORRECTION

PATENT NO. : 5,191,810
DATED : March 9, 1993
INVENTOR(S) : Craft, et al

It is certified that error appears in the above-indentified patent and that said Letters Patent is hereby corrected as shown below:

ON THE TITLE PAGE, in Assignee item #73, insert --Chrysler Corporation--

Signed and Sealed this

Fifth Day of July, 1994

Attest:

BRUCE LEHMAN

Attesting Officer

Commissioner of Patents and Trademarks